United States Patent [19]

Campbell et al.

[11] Patent Number: 5,272,231

[45] Date of Patent: Dec. 21, 1993

[54] NITRIC OXIDE FOR VAPOR PHASE ELIMINATION OF STYRENE AND ACRYLONITRILE POPCORN POLYMER IN BULK SAN PRODUCTION

[75] Inventors: Stephen M. Campbell, New England; Chen-Youn Sue, Williamstown, both of W. Va.

[73] Assignee: General Electric Company, Pittsfield, Mass.

[21] Appl. No.: 47,173

[22] Filed: Apr. 13, 1993

Related U.S. Application Data

[63] Continuation of Ser. No. 920,956, Jul. 28, 1992, abandoned.

[51] Int. Cl.$^5$ ................................................ C08F 2/02
[52] U.S. Cl. .................................... 526/236; 526/342
[58] Field of Search .............................. 526/236, 342

[56] References Cited

U.S. PATENT DOCUMENTS

| | | |
|---|---|---|
| 2,371,719 | 3/1945 | Starkweather . |
| 2,485,277 | 10/1949 | Gilbert ................. 526/236 |
| 2,694,692 | 11/1954 | Amos et al. . |
| 2,727,884 | 12/1955 | McDonald et al. . |
| 2,793,199 | 5/1957 | Kurtz ................. 526/236 |
| 3,201,365 | 8/1965 | Charlesworth et al. . |
| 3,243,481 | 3/1966 | Ruffing et al. . |
| 3,243,481 | 3/1966 | Ruffing et al. . |
| 3,418,300 | 12/1968 | Nakajima et al. ............ 526/236 |
| 3,509,237 | 4/1970 | Aubrey . |
| 3,658,735 | 4/1972 | Nakao et al. . |
| 3,660,535 | 5/1972 | Finch et al. . |
| 3,660,536 | 5/1972 | Ayano et al. . |
| 3,692,504 | 9/1972 | Jones et al. . |
| 3,903,202 | 9/1975 | Carter et al. . |
| 3,964,979 | 6/1976 | Watson . |
| 4,070,419 | 1/1978 | Watson ................. 526/236 |
| 4,221,833 | 9/1980 | Guillermin et al. . |
| 4,239,863 | 12/1980 | Bredeweg . |
| 4,326,051 | 4/1982 | Suling et al. . |
| 4,338,162 | 7/1982 | Johnson . |
| 4,387,179 | 6/1983 | Sun . |
| 4,612,348 | 9/1986 | Sun . |
| 4,640,959 | 2/1987 | Narasaiah . |

FOREIGN PATENT DOCUMENTS

| | | |
|---|---|---|
| 672031 | 11/1965 | Belgium . |
| 677334 | 3/1966 | Belgium . |
| 1161993 | 2/1984 | Canada . |
| 2743348 | 9/1977 | Fed. Rep. of Germany . |
| 3434138 | 9/1984 | Fed. Rep. of Germany . |
| 57137309 | 2/1981 | Japan . |
| 58049479 | 9/1981 | Japan . |
| 58201619 | 5/1982 | Japan . |
| 744504 | 2/1956 | United Kingdom ............. 526/236 |
| 798347 | 7/1958 | United Kingdom ............. 526/236 |
| 799474 | 8/1958 | United Kingdom . |
| 858044 | 1/1961 | United Kingdom ............. 526/217 |
| 1218233 | 11/1968 | United Kingdom . |

OTHER PUBLICATIONS

Monatshefte for Chemie, vol. 106, No. 3 pp. 649-656, 1976.) Mh. Chem. vol. 98, No. 5, pp. 1, 767-1, 771, 1967.
U.S. Application No. 07/920,725 Sulfur Dioxide For Vapor Phase Elimination Of Styrene And Acrylonitrile Popcorn Polymer In Bulk San Production.

*Primary Examiner*—Joseph L. Schofer
*Assistant Examiner*—N. Sarofim

[57] ABSTRACT

A bulk or mass polymerization process is provided which involves bulk polymerization of vinyl monomers in a liquid phase in the presence of a nitrogen rich vapor phase containing amounts of nitric oxide effective to inhibit formation of popcorn polymer in the vapor head space during the reaction. The process may be used as a step in the formation of polymer or may be used as the entire reaction process.

8 Claims, No Drawings

NITRIC OXIDE FOR VAPOR PHASE ELIMINATION OF STYRENE AND ACRYLONITRILE POPCORN POLYMER IN BULK SAN PRODUCTION

This is a continuation of copending application Ser. No. 07/920,956 filed on Jul. 28, 1992, now abandoned.

BACKGROUND OF THE INVENTION

1. FIELD OF THE INVENTION

The present invention relates to bulk polymerization processes for making vinyl aromatic/vinyl cyanide copolymers, and more particularly relates to bulk polymerization processes having a vapor phase additive which inhibits popcorn formation.

2. DESCRIPTION OF THE RELATED ART

Mass or bulk polymerization techniques for making copolymers of monoethelenically unsaturated polar monomers and monovinylidene aromatic monomers are known, see U.S. Pat. Nos. 3509237; 3660535; 3243481; 4221833 and 4239863, all of which are incorporated herein by reference. Such copolymers may be rubber modified graft copolymers or may be rubber-free rigid copolymer. Bulk processes, such as those involving a boiling reactor, typically involve a liquid phase held under a nitrogen (N2) atmosphere. In boiling reactors, heat of reaction is the source of heat to the reactor to cause boiling of the liquid monomeric composition. Boiled monomer then enters the nitrogen vapor phase, contacts the reactor dome, which is typically air or water cooled, condenses and returns to the liquid phase. Condensed monomer on the reactor dome will generate undesired, crosslinked popcorn polymer. Popcorn generation at the dome surface may be due in part to the absence of typical polymerization inhibitors in the gas phase because of low volatility of the inhibitors with respect to the monomers, thereby necessitating that an inhibitor be present in the vapor phase if popcorn formation is to be inhibited. In the past, inhibitors such as oxygen have been incorporated into the vapor phase to prevent popcorn formation. It is believed, however, that oxygen may be incorporated into polymer and may contribute to the formation of black carbonaceous material on the reactor walls. Analysis of the black material has indicated that the material has a high oxygen content which tends to support the proposition that the oxygen inhibitor is part of the cause of the formation thereof. Additionally, oxygen (O2) has a high solubility in many liquid organic monomers which tends to support the proposition that the oxygen is present in the liquid monomer phase during the bulk polymerization process.

Accordingly, there is a need for vapor phase additives which will inhibit popcorn formation in bulk polymerization processes.

SUMMARY OF THE INVENTION

The present invention involves a bulk or mass polymerization process wherein vinyl monomers are reacted in a liquid phase which is blanketed by a vapor phase of diatomic nitrogen atmosphere comprising nitric oxide. The nitric oxide inhibits popcorn polymer formation in the vapor head space during the bulk polymerization process.

DETAILED DESCRIPTION OF THE INVENTION

The present invention involves a bulk or mass polymerization process wherein a liquid phase comprising vinyl monomers is heated to cause polymerization of the monomers. The liquid phase is blanketed by a nitrogen rich vapor phase that comprises an amount of nitric oxide effective to prevent popcorn polymer formation.

The vinyl monomers, in the absence of an effective inhibitor, are susceptible to the formation of a hard, brittle, highly crosslinked polymer, which is referred to as "popcorn polymer" in the prior art because of its physical appearance.

Compounds suitable for homopolymerization and/or copolymerization in the process of this invention include vinyl monomers in the following classes:

1. (Alkyl)acrylate monomers which are polymerizable organic compounds containing a single ethylenic double bond conjugated with a carbon to oxygen double bond, i.e., compounds containing the structure:

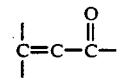

2. Vinyl cyanide monomers which are polymerizable organic compounds containing a single ethylenic double bond conjugated with a carbon to nitrogen triple bond, i.e., compounds containing the structure:

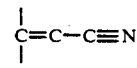

3. Vinyl aromatic monomers which are polymerizable organic monomers containing a single ethylenic double bond conjugated with a carbon atom in an aromatic nucleus.

Examples of monomers in class 1 include acrylic, methacrylic, ethacrylic and crotonic acid, and esters thereof, wherein the ester group contains one to 18 carbon atoms and wherein the alkyl group contains 1 to about 4 carbon atoms.

Specific examples of class 1 monomers are methyl acrylate, ethyl acrylate, isopropyl acrylate, butyl acrylate, 2-ethylhexyl acrylate, dodecyl acrylate, octadecyl acrylate, methyl methacrylate, butyl methacrylate, 2-ethylhexyl methacrylate, ethyl ethacrylate, octyl ethacrylate, methyl crotonate, heptyl crotonate, cyclohexyl acrylate, cyclohexyl methacrylate, benzyl acrylate, isobornyl acrylate and phenyl methacrylate. Preferably the alkyl acrylate monomer is methyl methacrylate.

Also included as useful ester monomers are hydroxyalkyl esters of acrylic, methacrylic, ethacrylic, ethacrylic or crotonic acids wherein the hydroxyalkyl group contains 2 to 10 carbon atoms and is, preferably, a beta-hydroxyalkyl group. Examples of hydroxyalkyl ester monomers are beta hydroxyethyl acrylate, beta hydroxyethyl methacrylate, beta hydroxyethyl crotonate, beta hydroxyethyl ethacrylate, beta hydroxypropyl acrylate, beta-hydroxy propyl methacrylate, gamma hydroxypropyl methacrylate, beta-hydroxybutyl acrylate, gamma hydroxybutyl methacrylate, delta hydroxybutyl crotonate, beta hydroxyoctyl acrylate and beta hydroxy-decyl methacrylate.

Homopolymerizable and/or copolymerizable monomers in class 2 are acrylonitrile, methacrylonitrile, ethacrylonitrile, crotonic nitrile, etc. Preferably the vinyl cyanide monomer is acrylonitrile.

Polymerizable monomers in class 3 include styrene, vinyl toluene, vinyl naphthalene, α-methyl styrene, chlorostyrene, bromostyrenes and the like. Preferably the vinyl aromatic monomer is styrene.

The process of the present invention may involve reacting a vinyl monomer feedstream in a batch, semi-batch or continuous process manner. The feedstream preferably comprises from about 20 to about 80 parts by weight of vinyl cyanide monomer based on the total weight of the liquid feedstream and from about 80 to about 20 percent by weight of vinyl aromatic monomer based on the total weight of the liquid feedstream and from about 0 to about 30 percent by weight of a diluent based on the total weight of the liquid feedstream. The diluent serves as a solvent for vinyl aromatic monomer and vinyl cyanide and as a diluent for a vinyl aromatic/vinyl cyanide copolymer formed thereby. Preferably the liquid phase comprises from 65 to 85 percent by weight vinyl aromatic monomer based on the total weight of the liquid phase and preferably the liquid phase comprises from 15 to 35 percent by vinyl cyanide monomer based on the total weight of the liquid phase. Preferably the feedstream is passed into a polymerization zone in either a batch, semi-batch or continuous manner, wherein the feedstream becomes a liquid phase reaction mass, in the presence of a nitrogen vapor phase blanket, is maintained at a temperature of from about 100° C. to about 170° C. under a pressure of from about 5 to about 300 pounds per square inch absolute (hereinafter "psi") whereby at least a portion of the feedstream is thereafter subjected to heat and vacuum sufficient to remove at least a major portion of any residual unpolymerized components of the feedstream including the diluent. The improvement being the incorporation within the nitrogen vapor phase of a nitric oxide polymerization initiator at from about 0.05 parts to about 5 parts per hundred parts by volume of nitrogen over the liquid phase reaction mass. A given level of nitric oxide is attained and maintained in the vapor phase over the liquid phase as the polymerization zone while the liquid phase is being polymerized. Preferably the nitric oxide is maintained at a level of at least 0.1 parts per hundred parts by volume of nitrogen over the reaction mass. The residence time of the liquid phase reaction mass within the polymerization zone can be in a range from about one hour to a few hours depending on reaction temperatures and monomer conversions.

The vinyl aromatic monomer is preferably styrene of commercial purity and is present at a level of from 85 to 20 percent by weight based on the total weight of the liquid feedstream and more preferably at a level of from 65 to 85 percent by weight thereof. Correspondingly, the liquid phase reaction mass initially comprises 65 to 85 percent by weight vinyl aromatic monomer based on the total weight of the liquid phase reaction mass.

The vinyl cyanide monomer is preferably acrylonitrile of commercial purity and is present in an amount of from 15 to 80 parts by weight based on the total weight of the feedstream and more preferably at a level of from 15 to 35 percent by weight thereof. Correspondingly, the liquid phase reaction mass initially comprises 15 to 35 percent by weight vinyl cyanide monomer based on the total weight of the liquid phase reaction mass.

Although diluent is not essential for the copolymerization, it can be used for viscosity adjustment of the feedstream and ultimately the liquid phase reaction mass. The diluent is, therefore, a solvent in which the vinyl aromatic and vinyl cyanide monomers are soluble. More advantageously, the diluent is selected from the group consisting of ethylbenzene and N,N-dimethylformamide in an amount of from about 0 to about 30 parts by weight, based upon the total weight of the feedstream. Beneficially, the diluent is selected from the group consisting of ethylbenzene and N,N-dimethylformamide in an amount of from about 15 to about 25 parts by weight, based upon the total weight of the feedstream. Preferably, the diluent consists of from about 15 to 25 parts by weight, based upon the total weight of the feedstream of ethylbenzene.

The feedstream preferably consists of from 85 to 20 parts by weight of styrene, from 15 to 80 parts by weight of acrylonitrile, and from about 0 to about 30 parts by weight of a diluent such as ethylbenzene. Optionally, other vinyl monomers may be present in the feedstream. Also, optionally, the process may be used for making a rubber modified polymer, for example an ABS graft copolymer or an ASA copolymer as set out below by including in the feedstream a rubbery polymer such as polybutadiene or polybutylacrylate. Bulk polymerization of a rubber modified polymer typically involves dissolving of the rubbery polymer in the monomeric composition followed by polymerization of the monomers to yield a grafted copolymer followed by phase inversion and completion of the reaction to build molecular weight and crosslink the rubber.

In practicing the process of this invention, one may use a recirculating coil apparatus, a recirculating tube train apparatus or a boiling reactor. The polymerization initiator is added, if the reaction is not thermally initiated, to the feedstream after mixing and prior to being passed into a polymerization zone.

Advantageously, the feedstream is subjected to temperatures of from about 100° C. to about 170° C. and to pressures of from about 5 to about 300 psi. Preferably, the feedstream is subjected to temperatures of from about 135° C. to about 155° C. and to pressures of from about 100 to about 200 psi for the recirculating coil apparatus and the recirculating tube train apparatus or from about 10 to about 60 psi.

When using the boiling reactor, the rate of reaction within the boiling reactor will be difficult to control at pressures in excess of 60 psi.

The product of the polymerization process is subjected to heat and vacuum sufficient to remove at least a major portion of any residual unpolymerized components of the feedstream, such as the diluent, the styrene and acrylonitrile monomers, and unwanted volatiles from the polymerization system.

Any of the well known solvents can be used as a reaction medium for conducting the process of this invention, such solvents being aromatic, cycloaliphatic and aliphatic hydrocarbons, ketones, esters, ethers, alcohols and the like. However, as stated herein before it is preferred to carry out the polymerizations as bulk polymerizations wherein no solvent is used.

The process of the present invention preferably involves mass polymerization of styrene and acrylonitrile in a liquid phase blanketed by a nitrogen atmosphere containing 0.1 to 1 volume percent nitric oxide (NO) as an inhibitor of crosslinked SAN popcorn formation in the vapor space of the reactor vessel.

The process of the present invention may also be used to prevent popcorn formation in the production of bulk vinyl aromatic/vinyl cyanide/rubber graft copolymers such as bulk ABS or a rubber modified polymer such as vinyl aromatic/vinyl cyanide/butyl acrylate copolymers such as bulk ASA.

The "ABS resin prepared by bulk polymerization" employed in this invention means a product obtained by dissolving a butadiene type rubber, such as polybutadiene or a butadienestyrene copolymer, into a mixture of a vinyl cyano compound represented by acrylonitrile and a vinyl aromatic hydrocarbon (including a halogenated compound) represented by styrene, polymerizing the mixture as polymerization advances, until the polymerization is substantially completed. The amount of the rubber to the total amount of the monomer mixture (styrene plus acrylonitrile) is 1-50 wt. percent, preferably 2-20 wt. percent. The monomer mixture preferably contains 85 to 65 percent by weight of styrene to 15 to 35 percent by weight of acrylonitrile based on the total combined weight of the styrene and acrylonitrile.

The present process may also be employed as a step in a multistep polymerization process including, for example, a bulk suspension process such as for the production of vinyl aromatic/vinyl cyanide/rubber graft copolymers wherein the bulk process is employed, until 10–40 percent by weight of the vinyl cyano compound and vinyl aromatic compound are polymerized, and then adding water and a suspension stabilizer to the polymerization system and continuing the polymerization under the suspension polymerization conditions until the polymerization is substantially completed.

The following examples illustrate the improvements which result from the process of this invention but are not in limitation thereof.

The present invention was experimentally examined on a 2-gallon reactor facility for bulk SAN in continuous processes. In the facility, there were three units: a monomer feed unit, a reactor unit, and a devolatilization/pelletization unit. Two different control experiments were carried out. The first one was the control experiment that produced significant amount of SAN popcorn (about 20 grams) in the vapor head space of the 2-gallon reactor over a given reaction time length (40 hours), using only nitrogen (>99.95%) as the reaction atmosphere. The second one was also the control experiment that produced no SAN popcorn over the same reaction hours, using 2% oxygen in nitrogen (by volume). The polymerization reactions for all the experiments were set at the same reaction conditions except that the reaction atmospheres were changed from one type to another. The experiments using nitric oxide in nitrogen, at levels of 0.1% to 1% by volume nitric oxide based on the total combined volume of the nitrogen and nitric oxide, show that the formation of SAN popcorn was prevented in the vapor head space. Table 1 shows conditions and results for these experiments.

TABLE 1

Conditions and Results for SAN Popcorn Prevention Experiments Using a 2-Gallon Reactor Facility*

| Example | ST/AN/NOM (Wt.)** | Rx. Temp. °C. | Rx. Atm. | Rx. Hrs. | SAN Popcorn |
|---|---|---|---|---|---|
| A | 69/31/0.15 | 120 | $N_2$ | 40 | 22 g |
| 1 | 69/31/0.15 | 120 | 1.0% NO in $N_2$ | 40 | 0 |
| 2 | 69/31/0.15 | 120 | 0.5% NO in $N_2$ | 40 | 0 |
| 3*** | 69/31/0.15 | 120 | 0.1% NO in $N_2$ | 40 | 0 |
| B | 69/31/0.15 | 120 | 2.0% $O_2$ | 40 | 0 |

*The reactor top lid was cooled by compressed air and was kept at 70 to 75° C.
**ST/AN/NOM: styrene/acrylonitrile/n-octyl mercaptan feed ratio by weight.
***No SAN popcorn material was found in the vapor head space, but 3.9 grams of soft and pliable material of non-popcorn nature were found. Results from FT-IR analysis (sample preparation and styrene/acrylonitrile ratio) for this material agreed with the "non-popcorn nature" statement.

SAN popcorn means the amount of SAN popcorn formed during the reaction.

One possible advantage of using nitric oxide is its low solubility in organic monomers, and thus making it unlikely that the nitric oxide will be present in the liquid phase in levels sufficient to interfere or react with the liquid monomers, and thus will most likely neither be incorporated into the polymer to a degree of concern nor generate black carbonaceous materials. The process may be employed as a step in bulk-suspension processes, or may be used as the entire polymerization process. Preferably the vapor phase comprises less than 0.05 percent by volume diatomic oxygen based on the total volume of nitrogen in the vapor phase.

We claim:

1. A bulk polymerization process comprising reacting vinyl monomers in a liquid phase, said liquid phase being in the presence of a vapor phase comprising diatomic nitrogen, vinyl monomer, and nitric oxide, said nitric oxide being present at a level sufficient to inhibit popcorn polymer formation.

2. The process of claim 1 wherein liquid phase comprises styrene and acrylonitrile.

3. The process of claim 1 wherein said liquid phase comprises styrene, acrylonitrile, and linear polybutadiene polymer and butadiene copolymer.

4. The process of claim 1 wherein said liquid phase comprises styrene, acrylonitrile and polybutylacrylate.

5. The process of claim 1 wherein said nitric oxide is present at a level of from 0.1 to 1 percent by volume based on the total combined volume of the diatomic nitrogen and nitric oxide in the vapor phase.

6. The process of claim 5 wherein said vapor phase comprises less than 0.05 percent by volume diatomic oxygen based on the total volume of the nitrogen in the vapor phase.

7. The process of claim 1 wherein said polymerization is in a boiling reactor.

8. The process of claim 1 wherein said liquid phase comprises from 65 to 85 percent by weight styrene based on the total Weight of said liquid phase, and said liquid phase comprises from 15 to 35 percent by weight acrylonitrile based on the total weight of said liquid phase.

* * * * *